Dec. 4, 1934.  G. A. BARKER  1,982,625
DUAL MANIFOLD CONSTRUCTION
Original Filed April 5, 1932
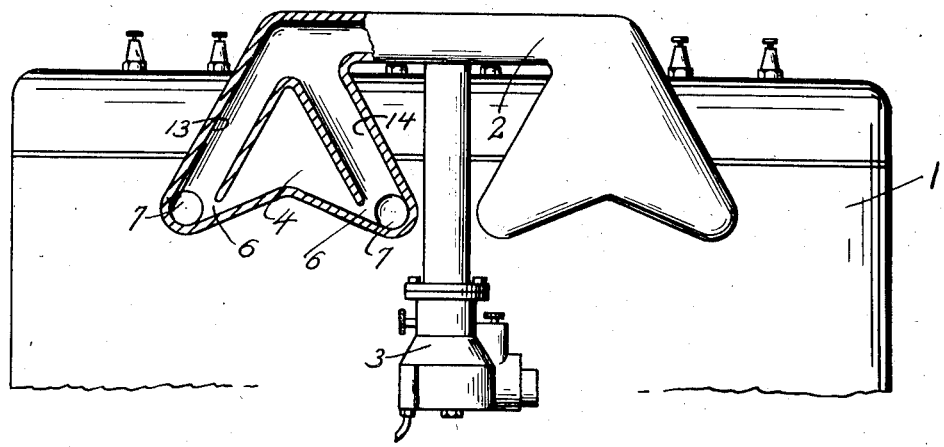
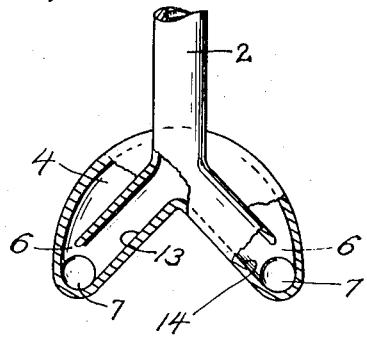 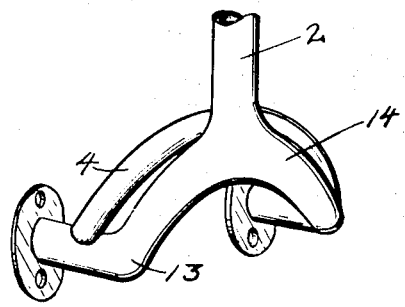
Inventor
George A. Barker
By  Attorney Patented Dec. 4, 1934

1,982,625

UNITED STATES PATENT OFFICE 1,982,625

DUAL MANIFOLD CONSTRUCTION

George A. Barker, Rochester, N. Y.

Original application April 5, 1932, Serial No. 603,423. Divided and this application December 7, 1932, Serial No. 646,107

7 Claims. (Cl. 123—52)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to internal combustion engines or the like and more particularly to the manifold through which the operating fuel gas is conveyed to the cylinders, this application being a division of applicant's co-pending application Serial No. 603,423, filed April 5, 1932 and entitled Manifold.

The principal object of the invention is to maintain a substantially constant flow of gas within the intake manifold, in the direction of the intake valve, and thereby eliminate surging of the gas in said manifold caused by the closing of the said valve.

Another object of the invention is to provide a reservoir with a storage for intake gas in close proximity to the intake valve where said gas may be held under pressure and instantly released to enter the cylinder on a subsequent opening of said valve.

A further object of the invention is to increase the volumetric efficiency, as well as the horsepower per piston displacement, of a reciprocating engine.

With these and other objects in view, which will become apparent from the following disclosure, the invention resides in the novel details of construction and combination of parts which are recited in the following specification and particularly pointed out in the claims.

Referring to the accompanying drawing, forming a part of this specification, in which like numerals designate like parts in all the views:

Fig. 1 is a side elevation of the cylinder block of an internal combustion engine showing the intake manifold and carbureter; the manifold shown is of the Y type with the compression chamber located between the divergent intake passages.

Fig. 2 is a sectional view of a manifold of the Y type in which the compression chamber lies to one side and above the divergent intake passages, and Fig. 3 is a perspective view illustrating another modification of the Y shaped manifold, wherein the compression chamber consists of a pipe or tube bridging the terminals of, and parallelly disposed to the branches of the Y.

The present and usual types of intake manifolds used on internal combustion engines have an interior diameter or cross-sectional area which is substantially uniform from the carbureter to the intake port of the cylinder block, whereby it follows that the intake port, the intake manifold, and the carbureter port connecting with the manifold, are all of substantially the same area. Further, the combustible fuel gas from the carbureter is drawn through the intake manifold into the cylinders of the engine by the operation of the pistons and the intake valves. That is to say, the piston receding or moving downwardly in a cylinder produces a suction which, when the intake valve is open, draws an amount of fuel gas into the cylinder from the manifold, this amount of gas being retained in the cylinder by automatic closing of said valve at approximately the limit of the receding or down stroke of said piston. On the upward or advancing stroke, the piston compresses the fuel gas just drawn into the cylinder, this compressed gas being ignited at approximately the limit of the advancing stroke of the piston, the force of the ignited gas driving the piston downward on the next receding stroke at the end of which stroke the exhaust valve is automatically opened to permit the piston on the following upward or advance stroke to force the burned gas out of the cylinder. The cycle is then repeated, fresh fuel gas being drawn into the cylinder on the following down or receding stroke of the piston as just stated.

Thus it will be seen that the fuel gas is drawn very rapidly from the manifold into a cylinder at repeated and separated time intervals, instead of constantly, and that each of these time intervals is equivalent to a little more than one-fourth of the operating cycle, and that the fuel gas is entering the cylinder at high velocity during substantially one-half of one revolution of the engine shaft. For example, a single cylinder engine having a piston displacement of 100 cu. inches and turning over at 2000 R. P. M. will impart a velocity of several hundred feet per minute to the gas flow in the intake manifold. When the intake valve suddenly closes, the fuel gas in the manifold is still under this high velocity, and there is immediately built a pressure of corresponding value in the manifold closely adjacent the intake valve.

With the present and conventional type of manifold, the closing of the intake valve produces a sudden stop to this normal flow of gas under high velocity, and consequently there is a reaction which manifests itself in a compression, followed by a surging and retrograde flow, of the fuel gas in the manifold. This results in the creation of a low pressure area which undoubtedly is at least a partial vacuum in the vicinity of the intake valve. Obviously, when this valve again opens, this low pressure condition reduces the amount of fuel gas that can enter the cylinder, thereby lowering the potential efficiency of operation of the engine. This invention is therefore directed to the partial if not total elimination of this low pressure effect, by a change in construction of the conventional intake manifold.

According to this invention there is provided a reservoir or compression chamber located in the intake manifold in close proximity to the intake port or valve leading to the engine cylinder, said chamber being for the purpose of storing fuel gas during the time that the intake valve is closed and which will be ready for immediate charging into said cylinder as soon as said valve opens. This chamber may be of various shapes and sizes as best suited for the design of particular engines. For example, it may be in the shape of a projection extending radially from the manifold, or it may be formed so as to more closely hug the contour of the manifold. In the drawing various modifications of form have been particularly illustrated and will be individually described in the following, the general points of similarity in all the views being that 1 represents a cylinder or its casting block, 2 the intake manifold generally, 3 the carbureter, and 4 the reservoir or compression chamber generally and forming the subject matter of this invention.

With particular reference to Figs. 1 and 2, the compression chambers 4 at the ends of the manifold are made larger than the similar intermediate chambers 2, because the latter are more accessible to the gas supply. These chambers are cast integral with the intake manifold, converging or not as desired into a restricted neck portion 6 at their junction with said manifold, and are disposed in close proximity to the intake port 7 with which the manifold registers.

According to this construction, when the intake valve closes, the fuel gas under high velocity in the intake manifold instead of coming to an abrupt stop continues under rapidly reducing flow, the inertia of the gas causing a considerable portion thereof to enter the chamber 4 and become compressed and trapped therein due to the restricted neck 6. At the next opening of the valve the suction produced by the downwardly moving piston will act upon this entrapped and compressed gas to cause its immediate passage through the intake port 7 into the engine cylinder. By this time, the same piston produced suction will have caused the conventional flow of fuel gas from the carbureter through the manifold to and into said cylinder. Because of the storage of fuel gas in the chamber 4 and the initial flow of this entrapped gas, the peak velocity obtained in the intake manifold is not as great as in the usual or conventional type of manifold. When the intake valve again closes instead of having a sudden stoppage of gas flow, the gas passes into the reservoir or compression chamber such as 4, after which any surging of gas is confined to the intake manifold proper; thence the cycle repeats as heretofore explained.

This manifold construction is not unlike the well known water ram used in water systems under pressure. In fact the actions of an intake manifold of an engine, a water ram, and the rapid closing of a valve in a city water system, are very similar. In the latter case a shock absorbing means in the form of an air chamber or bulb is used to cushion or absorb the inertia of the flowing water in the pipe. Since water is practically incompressible, there results a change in volumetric air displacement within the air chamber or, in other words, the original air in the chamber is compressed into a smaller volume. In the device of this invention the fuel gas under high velocity is compressible and readily miscible with air in the chamber 4, wherefore there is no "hammer" effect occurring in this modified manifold when the intake valve closes, the gas becoming entrapped and compressed within the chamber, leaving the gas outside said chamber in the manifold subject only to any surging and retrograde flow. By "surging" is meant the sudden acceleration or movement of the column of fuel gas in any direction, as well as the sudden stopping of the moving column of said gas; in fact by it is meant any change in the directional movement of said gas column.

In Fig. 1 there is shown a type of compression chamber 4 which may be utilized in connection with a main manifold 2 terminating in diverging branch passages such as 13 and 14 each leading to the intake port 7 of an engine cylinder. In this type of manifold the compression chamber 4 is substantially triangular in shape being located between the diverging passages, the inner wall of each passage being cut off at the intake port end thereof to provide a restricted throat or passage 6 into said chamber 4. From said figure it will be understood that fuel gas will travel alternately and successively in the passages 13 and 14 according to which intake valve is open at the time. When the gas travel is in passage 13 then there will be movement of gas from the chamber 4 toward the inlet port associated with said passage and this automatically draws some of the gas in passage 14 into said chamber. Naturally the same gas flow takes place, only in alternate manner, when the other direction of gas travel is toward the inlet port associated with passage 14. Therefore, it will be evident that the chamber 4 always has gas therein ready for immediate discharge into either inlet port and in advance of the main flow of gas from the carbureter when the intake valves open.

Fig. 2 shows a somewhat similar construction wherein the main manifold 2 is provided with divergent branch passages 13 and 14 each leading to the intake port 7 of an engine cylinder, but here the compression chamber lies to one side of and above said passages instead of therebetween. The restricted throat 6 is likewise present in this modification.

The main manifold 2 of Fig. 3 is also branched forming the passages 13 and 14, but by this modified form of the invention the compression chamber 4 is a pipe or tube which may be straight or curved and which not only connects the branch passages 13 and 14 near their extremities but which also has a diameter substantially equal to the diameter of the manifold branch, wherefore there is not the decided restricted throat as illustrated in Figs. 1 and 2.

It is obvious that those skilled in the art may vary the details of construction and arrangements of parts without departing from the spirit of the invention, and therefore it is not desired to be limited to the foregoing except as may be required by the claims.

Having described my invention, what I claim as new and wish to secure by Letters Patent is:

1. In an internal combustion engine provided with a carbureter and a fuel intake port for a cylinder, the combination of an intake manifold having branches for conveying the fuel gas from said carbureter to a plurality of said intake ports; and a chamber bridging and restrictively communicating with the extremities of the branches of said manifold to receive a quantity of the conveyed fuel gas.

2. In an internal combustion engine provided with a carbureter and a fuel intake port for a cylinder the combination of an intake manifold having branches for conveying the fuel gas from said carbureter to a plurality of said intake ports; and a chamber bridging and restrictively communicating with the extremities of the branches of said manifold to receive a quantity of the conveyed fuel gas, said chamber being of sufficient capacity to overcome surging of gas in either of said branches.

3. In an internal combustion engine provided with a carbureter and a fuel intake port for a cylinder the combination of an intake manifold having branches for conveying the fuel gas from said carbureter to a plurality of said intake ports; and a chamber having a restricted opening disposed between two adjacent branches of said manifold to receive a quantity of the conveyed fuel gas from each branch.

4. In an internal combustion engine provided with a carbureter and a fuel intake port for a cylinder the combination of an intake manifold having branches for conveying the fuel gas from said carbureter to a plurality of said intake ports; and a chamber restrictedly communicating with the extremities of two adjacent branches of said manifold to receive a quantity of the conveyed fuel gas.

5. In an internal combustion engine provided with a carbureter and a fuel intake port for a cylinder the combination of an intake manifold having branches for conveying the fuel gas from said carbureter to a plurality of said intake ports; and a chamber disposed between two adjacent branches of said manifold to receive a quantity of the conveyed fuel gas from each branch, said chamber having a restricted opening and being of sufficient capacity to overcome surging of gas in either of said branches.

6. In an internal combustion engine provided with a carbureter and a fuel intake port for a cylinder, the combination of an intake manifold having branches for conveying the fuel gas from said carbureter to a plurality of said intake ports; and a chamber having a restricted opening and disposed between the branches of said manifold to receive a quantity of the conveyed fuel gas.

7. In an internal combustion engine the combination of an engine block and a conduit leading from a source of gaseous fuel supply, a chamber formed at the extremity of said conduit for receiving a portion of the fuel therein, said chamber having a restricted opening communicating with said conduit, and said engine block, and having an intake port for receiving fuel from conduit and said chamber.

GEORGE A. BARKER.